(12) United States Patent  
Carbonell et al.

(10) Patent No.: US 9,111,145 B2  
(45) Date of Patent: Aug. 18, 2015

(54) PARKING LOT INFORMATION SYSTEM USING IMAGE TECHNOLOGY FOR IDENTIFYING AVAILABLE PARKING SPACES

(71) Applicant: INTERNATIONAL BUSINESS MACHINES CORPORATION, Armonk, NY (US)

(72) Inventors: Lee A. Carbonell, Flower Mound, TX (US); Tsz Cheng, Grand Prairie, TX (US); Jeffrey L. Edgington, Keller, TX (US); Pandian Mariadoss, Allen, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/078,252

(22) Filed: Nov. 12, 2013

(65) Prior Publication Data

US 2014/0072178 A1    Mar. 13, 2014

Related U.S. Application Data

(63) Continuation of application No. 13/208,336, filed on Aug. 11, 2011, now Pat. No. 8,625,853.

(51) Int. Cl.  
*G06K 9/00* (2006.01)  
*G08G 1/017* (2006.01)  
*G08G 1/14* (2006.01)

(52) U.S. Cl.  
CPC ........ *G06K 9/00624* (2013.01); *G06K 9/00785* (2013.01); *G08G 1/0175* (2013.01); *G08G 1/142* (2013.01); *G08G 1/146* (2013.01)

(58) Field of Classification Search  
None  
See application file for complete search history.

(56) References Cited

U.S. PATENT DOCUMENTS

2008/0165033 A1* 7/2008 Chieu et al. .................. 340/990  
2010/0271480 A1* 10/2010 Bezborodko ................ 348/148  
2013/0113936 A1* 5/2013 Cohen et al. ................. 348/148

* cited by examiner

*Primary Examiner* — Atiba O Fitzpatrick  
(74) *Attorney, Agent, or Firm* — Patents on Demand P.A.; Brian K. Buchheit; Scott M. Garrett

(57) ABSTRACT

A parking lot information system comprising a digital camera for obtaining an image of parking spaces in the parking lot where each parking space is marked with a visual identifier, a computer coupled to the digital camera for identifying available parking spaces by recognizing the identifiers marking the available parking spaces, and a display coupled to the computer for displaying information on the available parking spaces.

20 Claims, 7 Drawing Sheets

PARKING LOT INFORMATION SYSTEM USING IMAGE TECHNOLOGY FOR IDENTIFYING AVAILABLE PARKING SPACES

CROSS-REFERENCE TO RELATED APPLICATIONS

This application claims the benefit of U.S. application Ser. No. 13/208,336 filed 11 Aug. 2011. The teachings of the parent case (application Ser. No. 13/208,336) are hereby incorporated by reference in their entirety.

BACKGROUND

The invention relates generally to parking lots, and more particularly, to a parking lot information system that uses image technology to identify available parking spaces and provide information on the parking lot to local and remote customers.

Parking lots (or parking garages) have been used for years at various locations, ranging from shopping malls to airports. A typical parking lot remains basically the same over the years. A customer generally receives a ticket with a timestamp at a parking lot entrance or an electronic toll tag attached to the car is read by a tag reader when the car enters the parking lot. The customer then often drive by rows of parked cars in the parking lot to find an available parking space. When the customer later returns to the parking lot to retrieve the car, the customer would need to find the original parking space where the car was parked. As the customer exits through a gate of the parking lot, the customer presents the parking ticket to a parking lot attendant to pay for the parking duration, or an automated reader reads the electronic toll tag of the car and charges the customer for the parking.

Customers often have a difficult time in finding available parking spaces in parking lots, especially if the parking lots are relatively large or almost full. In addition, a customer may not remember exactly where the car was parked and may need to pay the maximum parking fees if the customer loses the parking ticket.

BRIEF SUMMARY

The invention relates to a system, computer-implemented method, and computer program product for identifying available parking spaces in a parking lot or parking garage, tracking the status of parking spaces, and providing parking lot information to on-site and remote customers.

In one exemplary embodiment of the invention, a system comprises a plurality of visual identifiers each marking a parking space in a parking lot, a digital camera for obtaining an image of parking spaces in the parking lot, a computer coupled to the digital camera for identifying available parking spaces by recognizing the identifiers marking the available parking spaces, and a display coupled to the computer for displaying information on the available parking spaces.

In a second exemplary embodiment of the invention, a computer implemented method comprises obtaining an image of a parking lot by a camera, wherein the parking lot includes parking spaces marked by space identifiers; identifying available parking spaces in the parking lot by recognizing the identifiers marking the available parking spaces using a camera coupled to the computer; and displaying information on the available parking spaces to on-site and remote customers.

In a third exemplary embodiment of the invention, a computer program product comprises a computer readable storage medium having computer readable program code embodied therewith. The computer readable program code comprises computer readable program code configured to obtain an image of a parking lot by a camera, wherein the parking lot includes parking spaces marked by space identifiers; computer readable program code configured to identify available parking spaces in the parking lot by recognizing the identifiers marking the available parking spaces, using a computer coupled to the camera; and computer readable program code configured to display information on the available parking spaces to on-site and remote customers.

The details of the preferred embodiments of the invention, both as to its structure and operation, are described below in the Detailed Description section in reference to the accompanying drawings, in which like reference numerals refer to like parts. The Brief Summary is intended to identify key features of the claimed subject matter, but it is not intended to be used to limit the scope of the claimed subject matter.

DETAILED DESCRIPTION

Figure 1:
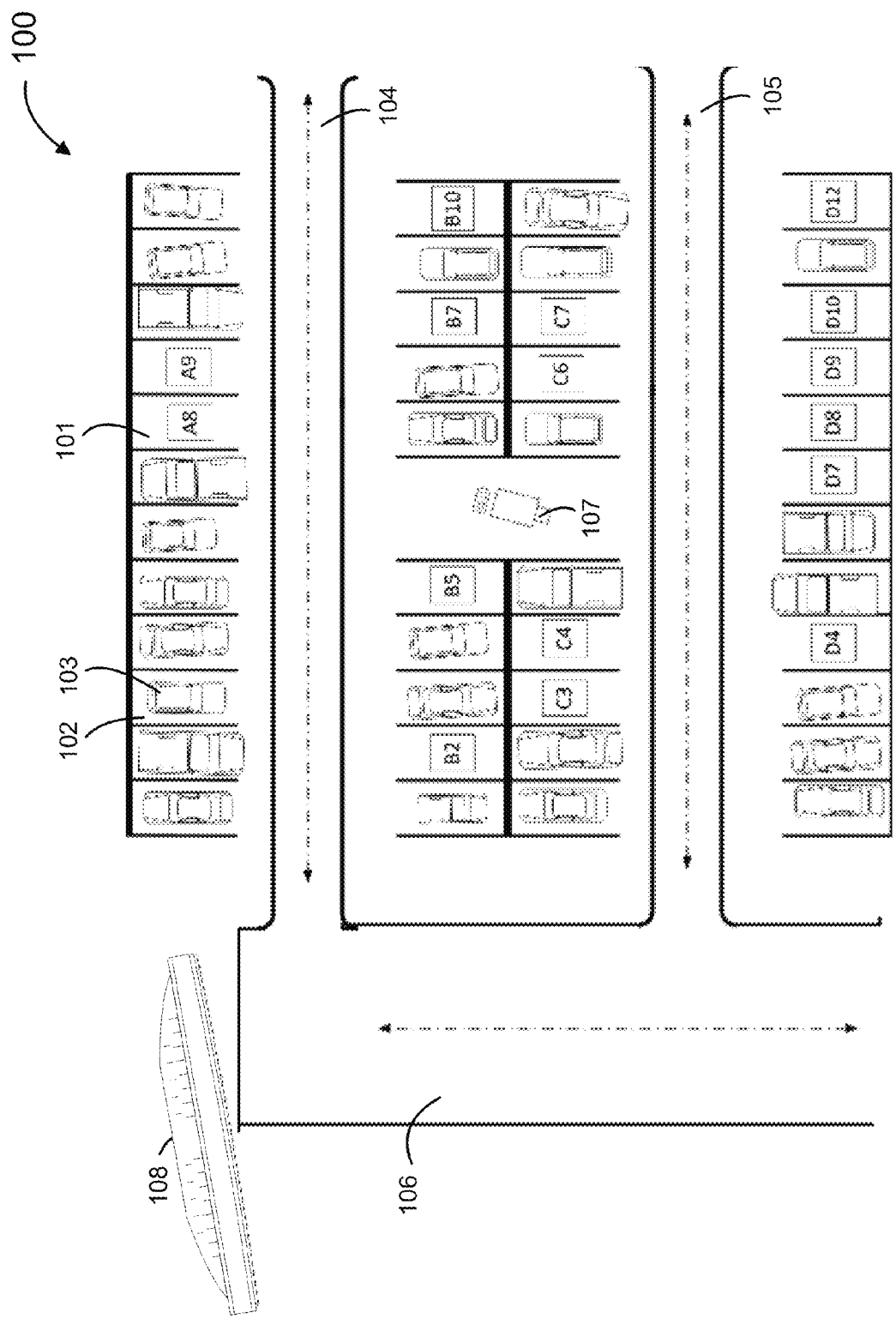
FIG. 1 is a diagram illustrating a parking lot or parking garage in which embodiments of the invention may be provided.

The disclosure relates generally to parking lots and parking garages. More particularly, the invention concerns a system, method, and computer program product for identifying and displaying available parking spaces in a parking lot, tracking of the parking spaces, and providing information on the parking spaces to on-site and remote customers.

In current parking lots, a driver may experience difficulties and delays in finding an available parking space, especially if a parking lot is relatively large and is almost full. Upon returning to the parking lot to retrieve the car, the driver may not remember the space where the car was parked and would have to pay for the delay in finding the car, or pay the maximum fees if the customer loses the parking ticket. Further, a parking lot company may charge the same rate for all of the parking spaces regardless of the convenience of the individual spaces to the customers. This is because the company would not know which parking space is used and for how long.

To better track the available parking spaces, the parking lot company may have an attendant record the parking space of a parked car or install a sensor to monitor each parking space. However, these approaches may not be practical due to their costs and other overheads. Embodiments of the invention provide an efficient system and method for quickly identifying and displaying available parking spaces in a parking lot to customers at any given time, directing customers to the available parking spaces, and tracking the occupancy of parking spaces in the parking lot to provide up-to-date information to on-site customers and remote customers through a computer network such as the Internet.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, there is illustrated a diagram of a parking lot or parking garage in which embodiments of the invention may be provided. The parking garage 100 includes individual parking spaces 101-102. As an example, the parking space 102 is currently occupied by a car 103 while parking space 101 is currently vacant and available to the drivers for parking. Drivers may enter the parking lot 100 through a main lane 106 and turn onto side lanes 104 and 105 to reach available parking spaces 101-102. When exiting the parking lot 100, the drivers again may use the main lane 106 to reach a parking lot exit.

In an exemplary embodiment of the invention, one or more camera 107 may be installed at appropriate locations in the parking lot 100 to provide a full view coverage of all the parking spaces in the parking lot 100. For example, multiple cameras 107 may be strategically positioned between two adjacent rows of parking spaces and at the ends of the rows to provide images of all of the parking spaces in these two rows. Cameras 107 may also be installed at the corners of the parking lot 100 to provide wide angle views of the parking lot 100.

The cameras 107 may be connected to a computer (not shown) located away from the parking spaces to minimize damages to the computer due to dust and heat in the parking lot 100. The connection between the cameras 107 and the computer may be through a video cable or a computer network. This computer may include a computer implementation that provides aspects of the invention, as described with reference to FIGS. 2-6. One or more display 108 may be strategically positioned in the parking lot 100 to provide information on the currently available parking spaces and other relevant parking information to the drivers. The display 108 may be connected to the computer that provides embodiments of the invention through a video display cable.

Figure 2:
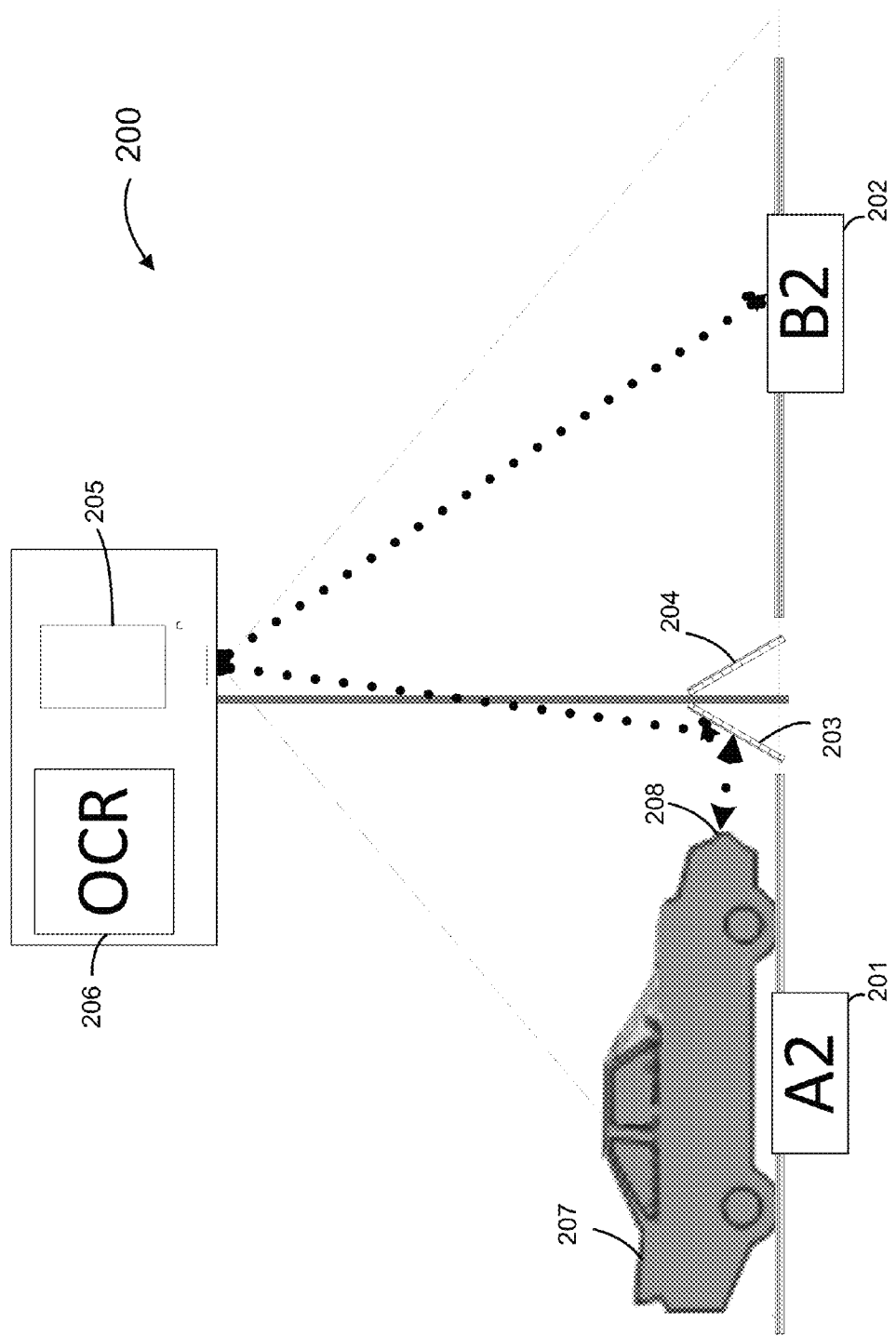
FIG. 2 is a block diagram illustrating a camera and mirror arrangement for sending an image of a parked car's license plate to the parking lot information system, according to an embodiment of the invention.

FIG. 2 is a block diagram illustrating a camera and mirror arrangement for sending an image of the license plates of parked cars in a parking lot to a parking lot information system, according to an embodiment of the invention. As an example, FIG. 2 shows two adjoining parking spaces 201 and 202. The parking space 201 is occupied by a car 207 while parking space 202 is currently unoccupied and available to customers for parking. As an example, camera 205 may be positioned above a wall that separates the adjoining parking spaces 201 and 202. A mirror 203 may be appropriately positioned to reflect an image of the license plate of parked car 207 to the camera 205. Similarly, a mirror 204 may be provided to reflect an image of the license plate of another car when this car is parked in the opposite space 202. To protect the mirrors 203-204 from accidental breakage, they may be installed within protecting enclosures with small openings to receive and send reflected images of the license plates of the parked cars.

While the car 207 is parked in the parking space 201, the car 207 may be on top of the parking space identifier A2 that marks the space 201 and thus block the direct view of the space identifier A2 from the camera 205. The camera 205, however, can still receive an image of a license plate 208 of car 207 from a reflected view of the license plate 208 by mirror 203. Mirror 203 may be appropriately positioned near the parking space 201 and associated with the parking space identifier A2 marking the parking space 201. The camera 205 and optical character recognition system 206 thus can recognize car 207 as being parked in the parking space 201.

On the other hand, the parking space 202 is currently vacant and available to customers for parking. The camera 205 has a direct view of the parking space identifier B2 that marks the parking space 202, as the space identifier B2 is not blocked by a parked car, and does not need to use mirror 204 to view a car license plate.

Figure 3:
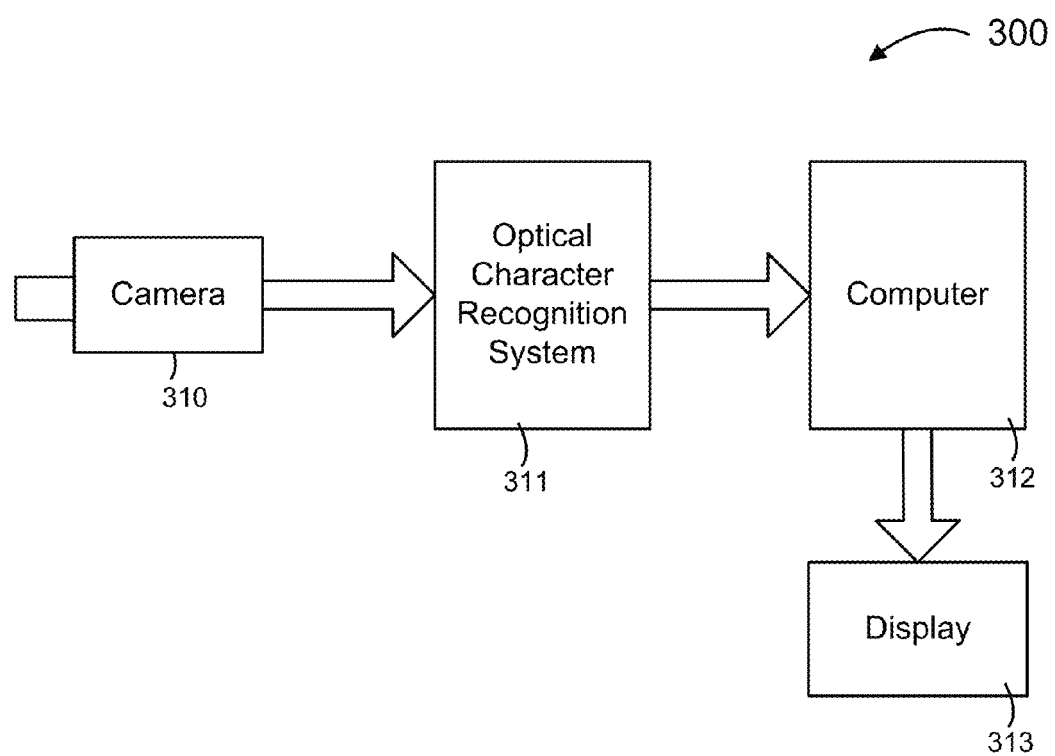
FIG. 3 is a block diagram illustrating a parking lot information system for identifying available parking spaces in a parking lot, tracking and displaying information on the parking spaces, according to an exemplary embodiment of the invention.

FIG. 3 is a block diagram illustrating a parking lot information system 300 for identifying and displaying available parking spaces in a parking lot, and tracking parking spaces, according to an exemplary embodiment of the invention. The parking lot information system 300 may include one or more digital camera 310 which may be connected to an optical character recognition system 311 to recognize the identifiers marking the parking spaces in the parking lot. The camera 310 may be a high definition wide-angle camera to provide a broad coverage of the parking lot and allow the camera to zoom into parts of a view of the parking lot. In one embodiment of the invention, the camera 310 is capable of creating separate video streams for portions of a view of the parking lot. The parking lot information system 300 may then relate the video streams to parts of the parking lot in processing information on the individual parking spaces.

The optical character recognition system 311 may employ a character recognition process as described in U.S. Pat. No. 7,295,694 for "MICR-based Optical Character Recognition System And Method" by R. Moon et al. and U.S. Pat. No. 5,933,531 for "Verification And Correction Method And System For Optical Character Recognition" by R. Lorie, which are hereby incorporated by reference. The optical character recognition system 311 may be connected to a computer 312 such as a server or a laptop computer. The computer 312 may display parking information to drivers and other customers on one or more displays 313. In one embodiment, multiple displays 313 may be positioned in appropriate locations in the parking lot to provide up-to-date information on available parking spaces to on-site drivers in the parking lot.

Figure 4:
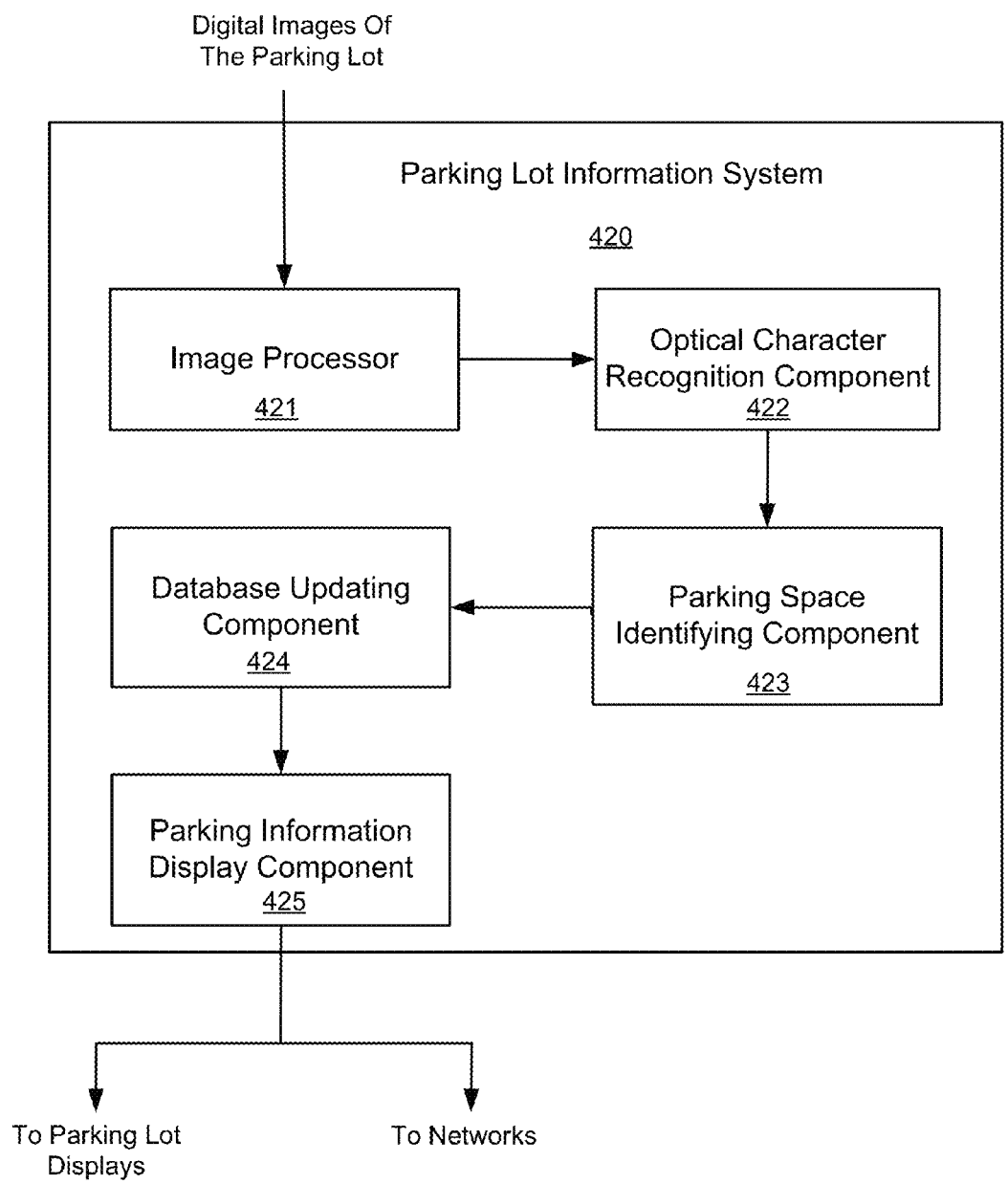
FIG. 4 is a block diagram showing components of a parking lot information system, according to an exemplary embodiment of the invention.

FIG. 4 is a block diagram illustrating components of a parking lot information system, according to an exemplary embodiment of the invention. The parking lot information system 420 may include an image processor 421 for receiving images of individual parking spaces in a parking lot, for example, from digital cameras 205 installed throughout the parking lot. The image processor 421 may enhance the quality of the received images using an image enhancement process known in the art. In addition, the image processor 421 may dissect the images and organize the images to facilitate the identification of the individual parking spaces and the space identifiers.

The parking lot processor 420 may employ an optical character recognition component 422 to better recognize characters in the parking space identifiers from the images received from the camera 205. Optical character recognition processes are described, for example, in U.S. Pat. No. 7,295,694 for "MICR-based Optical Character Recognition System And Method" by R. Moon et al. and U.S. Pat. No. 5,933,531 for "Verification And Correction Method And System For Optical Character Recognition" by R. Lorie, which are herein incorporated by reference.

Once the optical character recognition component 422 has recognized characters from the parking space markers, the parking space identifying component 423 may correlate the identified parking space markers with the parking spaces in the parking lot, including occupied spaces and available spaces. Information on the parking spaces in the parking lot may be maintained in a database that the parking lot information system 400 has access to. The information on each parking space may include its location in the parking lot and other characteristics, and its up-to-date occupancy status.

The parking lot information system 420 may include a database updating component 424 for updating the parking lot information database with the current status of each parking space in the parking lot based on information from the identifying component 423. For example, each parking space may have the status of "available" (or "unoccupied"), "unavailable" (or "occupied"), or "out-of-order". The parking lot information system 420 may transmit the updated information on the parking spaces to displays 108 and 313 located throughout the parking lot, or to remote customers via computer networks that the parking lot information system is connected to. In example scenarios, customers at remote locations may check on the availability of parking spaces or the number of available parking spaces in the parking lot 100 through computers at work, at home, or through smartphones and portable computers while on the road, before reaching the parking lot.

Figure 5:
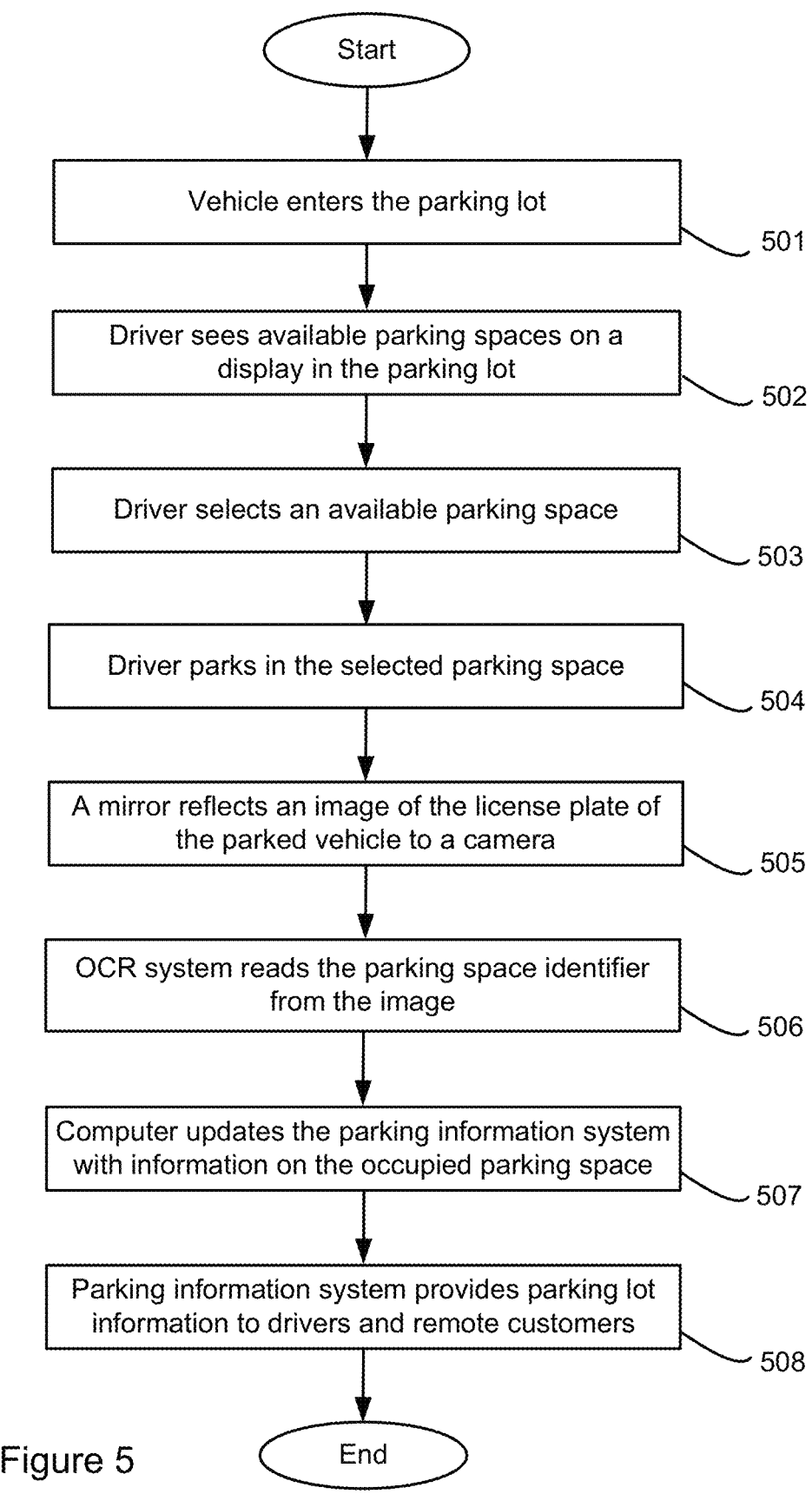
FIG. 5 is a flowchart of a process for identifying and displaying available parking spaces in a parking lot, tracking and displaying information on the parking spaces, according to an exemplary embodiment of the invention.

FIG. 5 illustrates a flowchart of a process for identifying and displaying available parking spaces in a parking lot, according to an exemplary embodiment of the invention. The process may begin at step 501 when a vehicle enters the parking lot. Through a display 108 located in the parking lot, the driver may immediately see where the currently available parking spaces in the parking lot are and their parking space identifiers (e.g., the parking space identifier B2 in FIG. 2), at step 502. The driver may select one of the available parking spaces from the display 108 (step 503) and proceed to park in one of the available parking spaces shown on the display 108 (step 504). The occupancy status of each parking space in the parking lot is available to on-site customers as well as to remote customers through networks connected to the parking lot information system. For example, remote customers may check for space availability at a parking lot through office workstations, portable computers, mobile communication devices with embedded computers and applications.

A mirror 203 at the selected parking space reflects the license plate of the parked car to a camera 205, at step 505. Optical character recognition system 206 may read the identifier of the occupied parking space from the image, at step 506, and send the parking space identifier to a computer 312 for processing. The computer 312 may update a parking lot information database with the current status of the now occupied parking space associated with the received space identifier, for example, from being "available" to "occupied", at step 507.

The parking lot information system then sends the updated status of the now occupied parking space to display 108 and remote customers through networks connected to the parking lot information system 420, at step 508. The updated status of the parking space is thus available to on-site customers as well as remote customers through office workstations, portable computers, and mobile communication devices with embedded computers and applications that can access the parking information system through computer networks. The availability of parking information to remote customers through computer networks also provides the customers the peace of mind when they leave their cars for an extended period of time, such as at an airport parking lot.

Figure 6:
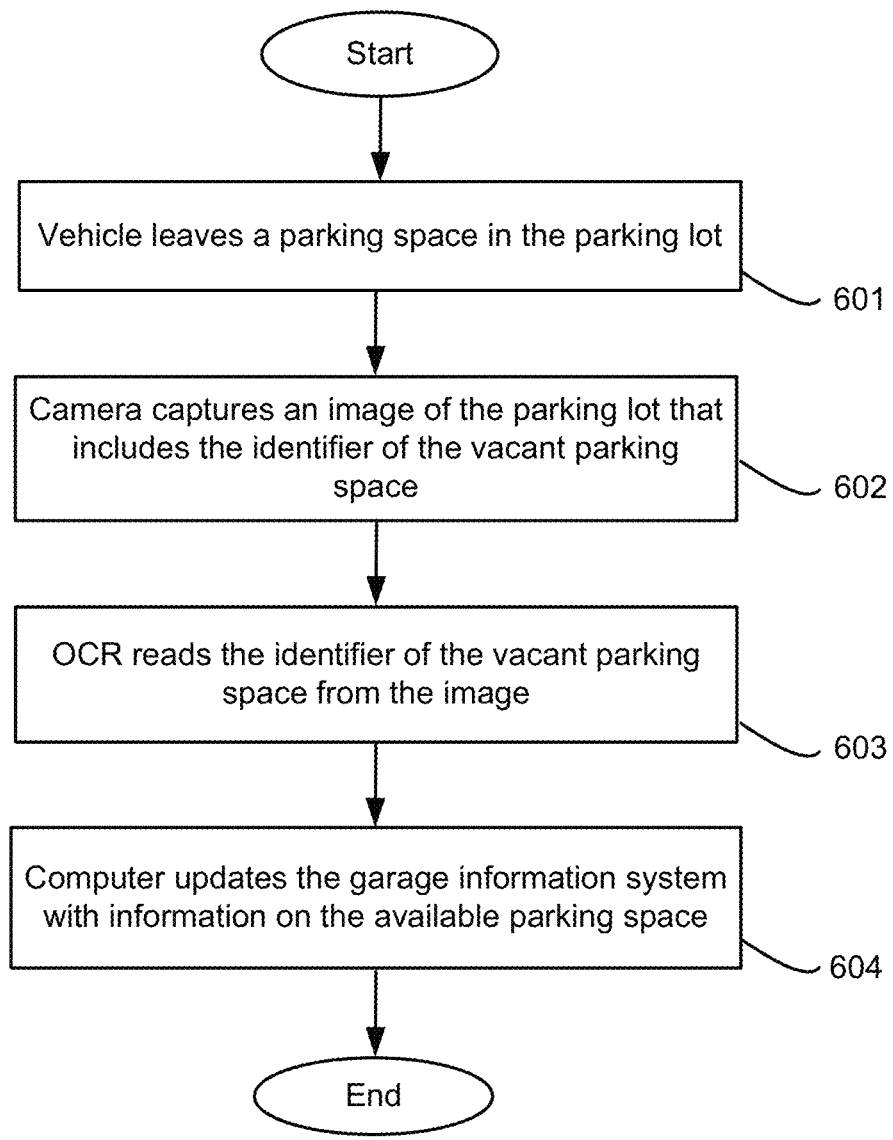
FIG. 6 illustrates a flowchart of a process identifying and displaying parking spaces that become available in a parking lot, according to an exemplary embodiment of the invention.

FIG. 6 illustrates a flowchart of a process identifying and tracking of the parking spaces that become available in a parking lot, according to an exemplary embodiment of the invention. The illustrated process may start at step 601 when a vehicle leaves a parking space to exit the parking lot. As the vehicle leaves the parking space, the identifier of the parking space becomes visible to a camera 205, at step 602. The optical character recognition component 206 of the parking lot information system may analyze an image from the camera to read the space identifier of the now vacant space and send the space identifier to computer 312, at step 603. The computer 312 may then update the status of this parking space from "occupied" to "available", per step 604.

Figure 7:
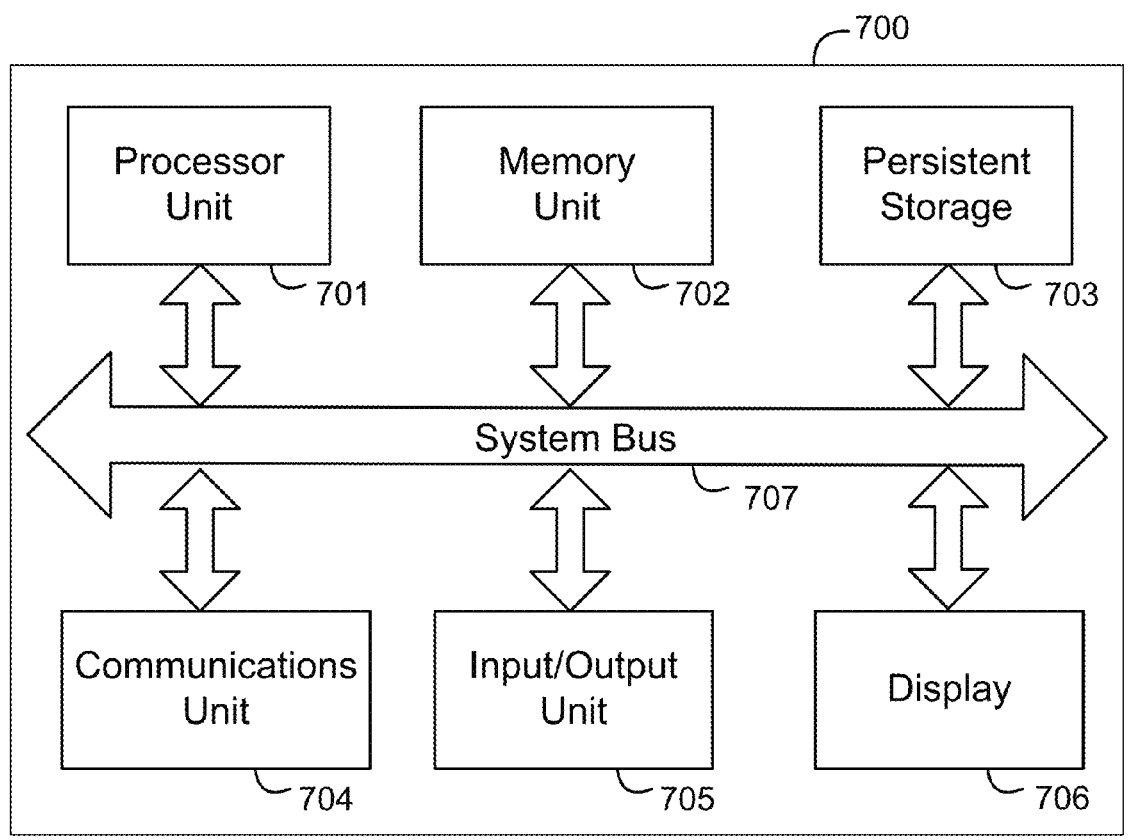
FIG. 7 is a block diagram of functional components in a computer system in which aspects of the invention may be implemented, according to an exemplary embodiment of the invention.

FIG. 7 is a block diagram of the functional components in a computer in which aspects of the invention may be implemented, according to an exemplary embodiment of the invention. Computer 700 includes a processor 701, a memory 702, a persistent storage 703, a communications unit 704, an input/output unit 705, a display 706, and system bus 707. As an example, processor unit 701 may include one or more processing cores and computer memory 702 may comprise EEPROM memory modules. Communications unit 704 may include network interface adapters, modems and support software. Input/output unit 705 may include a keyboard, mouse, and printer. Persistent storage 703 may comprise a hard disk drive or an optical disk drive.

Computer programs are typically stored in persistent storage 703 until they are needed for execution, at which time the programs are brought into memory unit 702 so that they can be directly accessed by processor unit 701. Processor 701 selects a part of memory 702 to read or write based on an address in memory 702 provided along with a read or write request. Usually, the reading and interpretation of an encoded instruction at an address causes processor 701 to fetch a subsequent instruction, either at a subsequent address or some other address.

An operating system runs on processor unit 701 to coordinate and control various components within computer 700 and to perform system tasks required by applications running on the computer 700. The operating system may be a commercially available or open source operating system, as are well known in the art.

Instructions for the operating system and applications or programs may be stored are located on storage devices, such as a hard disk drive 703. These instructions and may be loaded into main memory 702 for execution by processor 701. The processes of the illustrative embodiments may be performed by processor 701 using computer implemented instructions, which may be located in memory 702. Some of the processes may read from or write data to a data storage device such as hard disk drive 703.

The system components shown in FIG. 7 can be varied from the illustrative examples shown. In some illustrative examples, computer system 700 may be a personal digital assistant (PDA) configured with flash memory to provide a non-volatile memory for storing operating system files and/or user-generated data. Additionally, computer system 700 can be a tablet computer, laptop computer, or a computer-embedded communication device.

For the avoidance of doubt, the term "comprising", as used herein throughout the description and claims is not to be construed as meaning "consisting only of". It will be appreciated by those skilled in the art that the invention is not just limited to email messages, but is also applicable to other types of messages that have a distribution list that can be updated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A parking lot information system, comprising:
    a plurality of parking spaces in a parking lot;
    a digital camera for obtaining images of the parking spaces in the parking lot;
    a computer coupled to the digital camera for detecting vehicles in specific ones of the parking spaces from the images;
    the computer coupled to the display camera for:
    detecting unique vehicle identifiers from the images for vehicles occupying the parking spaces;
    indexing the unique vehicle identifiers to the parking spaces by using a mirror arrangement within each of the parking spaces, wherein the mirror arrangement reflects an image of a license plate of a vehicle parked in a corresponding parking space to the digital camera, and wherein the mirror arrangement is associated with a visual identifier of the parking space;
    responding to inquiries from remote devices, said inquiries being inquiries for specific ones of the vehicles occupying the parking spaces and for one or more available parking spaces, wherein the responding conveys messages providing parking location information to requestors; and
    allowing a requestor to select one of the available parking spaces.

2. The parking lot information system of claim 1, wherein the unique vehicle identifiers are license plate numbers.

3. The parking lot information system of claim 1, wherein the computer is further for:
    upon user request, providing images of user selected ones of the vehicles occupying the parking spaces for any durations that the vehicles are parked in the parking lot.

4. The parking lot information system of claim 1, wherein the computer is further for:
    upon user request, providing real time video images showing vehicle owners a user requested one of the vehicles that are parked in the parking lot.

5. The parking lot information system of claim 1, wherein the computer is further for:
    upon user request, providing location instructions to vehicle owners to aid owners in finding where a requested one of the vehicles is parked within the parking lot.

6. The parking lot information system of claim 1, wherein the computer is further for:
    providing messages to mobile devices of vehicle owners, said messages comprising status and change of status information regarding the vehicles in the parking lot while the vehicles are parked in the parking lot.

7. The parking lot information system of claim 1, wherein the computer is further for:
    identifying available parking spaces by recognizing the identifiers marking the available parking spaces.

8. A method comprising:
    a computing device detecting unique vehicle identifiers and unique parking identifiers from images of vehicles occupying parking spaces;
    the computing device indexing to the unique parking identifiers to the unique parking identifiers for the parking spaces by using a mirror arrangement within each of the parking spaces, wherein the mirror arrangement reflects an image of a license plate of a vehicle parked in a corresponding parking space to the digital camera, and wherein the mirror arrangement is associated with a visual identifier of the parking space; and
    the computing device responding to inquiries from remote devices, said inquiries being inquiries for specific ones of the vehicles occupying the parking spaces, wherein the responding conveys messages providing parking location information to requestors.

9. The method of claim 8, wherein the unique vehicle identifiers are license plate numbers.

10. The method of claim 8, further comprising:
    a set of cameras monitoring the parking spaces of the parking lot, wherein the computing device analyzes images from the cameras and utilizing optical character recognition to determine the unique vehicle identifier.

11. The method of claim 8, further comprising:
    the computing device, upon user request, providing images of user selected ones of the vehicles occupying the parking spaces for any durations that the vehicles are parked in the parking lot.

12. The method of claim 8, further comprising:
    the computing device upon user request, providing real time video images showing vehicle owners a user requested one of the vehicles that are parked in the parking lot.

13. The method of claim 8, further comprising:
    the computing device upon user request, providing location instructions to vehicle owners to aid owners in finding where a requested one of the vehicles is parked within the parking lot.

14. The method of claim 8, further comprising:
    the computing device providing messages to mobile devices of vehicle owners, said messages comprising status and change of status information regarding the vehicles in the parking lot while the vehicles are parked in the parking lot.

15. The method of claim 8, further comprising providing a mirror arrangement to reflect images of vehicle's license plates to a set of cameras, wherein the unique vehicle identifiers are numbers from the license plates detected by performing optical character recognition using the reflected images.

16. A computer program product comprising a non-transitory computer readable storage medium having computer readable program code embodied therewith, the computer readable program code comprising:
    computer readable program code, stored on the non-transitory computer readable storage medium, configured to detect unique vehicle identifiers and unique parking identifiers from images of vehicles occupying parking spaces;
    computer readable program code, stored on the non-transitory computer readable storage medium, configured to index the unique vehicle identifiers to the unique parking identifiers for the parking spaces by using a mirror arrangement within each of the parking spaces, wherein the mirror arrangement reflects an image of a license plate of a vehicle parked in a corresponding parking space to the digital camera, and wherein the mirror arrangement is associated with a visual identifier of the parking space; and computer readable program code, stored on the non-transitory computer readable storage medium, configured to respond to inquiries from remote devices, said inquiries being inquiries for specific ones of the vehicles occupying the parking spaces, wherein responding conveys messages providing parking location information to requestors.

17. The computer program product of claim 16, wherein the unique vehicle identifiers are license plate numbers.

18. The computer program product of claim 16, further comprising:

computer readable program code configured to monitoring the parking spaces of the parking lot using images from a set of cameras, wherein the computer readable program code configured to analyze images from the cameras and utilizing optical character recognition to determine the unique vehicle identifier.

19. The computer program product of claim 16, further comprising:

computer readable program code configured to, upon user request, provide images of user selected ones of the vehicles occupying the parking spaces for any durations that the vehicles are parked in the parking lot.

20. The computer program product of claim 16, further comprising:

computer readable program code configured to, upon user request, provide location instructions to vehicle owners to aid owners in finding where a requested one of the vehicles is parked within the parking lot.

\* \* \* \* \*